United States Patent
Yadid-Pecht et al.

(10) Patent No.: US 6,546,148 B1
(45) Date of Patent: Apr. 8, 2003

(54) CIRCUITRY FOR DETERMINING MEDIAN OF IMAGE PORTIONS

(75) Inventors: Orly Yadid-Pecht, Haifa (IL); Barmak Mansoorian; Bedabrata Pain, both of Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/115,318

(22) Filed: Jul. 14, 1998

Related U.S. Application Data

(60) Provisional application No. 60/052,399, filed on Jul. 14, 1997.

(51) Int. Cl.[7] .................................................. G06K 9/40
(52) U.S. Cl. ........................ 382/262; 382/272; 702/194; 708/304
(58) Field of Search ................................. 382/205, 254, 382/260, 262, 272; 702/190, 191, 194; 708/300, 304

(56) References Cited

U.S. PATENT DOCUMENTS

| | | | | |
|---|---|---|---|---|
| 4,817,175 A | * | 3/1989 | Tenenbaum et al. | 382/262 |
| 4,849,812 A | * | 7/1989 | Borgers et al. | 348/400.1 |
| 5,151,794 A | * | 9/1992 | Kumagai | 358/447 |
| 5,724,269 A | * | 3/1998 | Pedroni et al. | 702/191 |

* cited by examiner

*Primary Examiner*—Thomas D. Lee
(74) *Attorney, Agent, or Firm*—Fish & Richardson P.C.

(57) ABSTRACT

Hardware circuit for median calculation in an active pixel sensor.

21 Claims, 4 Drawing Sheets

CIRCUITRY FOR DETERMINING MEDIAN OF IMAGE PORTIONS

CROSS REFERENCE TO RELATED APPLICATIONS

This application claims the benefit of the U.S. Provisional Application Nos. 60/052,399, filed on Jul. 14, 1997, which is incorporated herein by reference.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

FIELD OF INVENTION

The present invention teaches enhancing fabrication yield of image sensors by using circuitry which compensates for faulty image sensor areas.

BACKGROUND

Consumer requirements have required larger and larger sensor arrays. However, as a sensor array gets larger, it becomes more difficult to reliably fabricate the sensor array. Fabrication yield and sensor cost can be proportional to the size of the sensor array.

Typically, any bad portion in a sensor array requires that the sensor array be discarded or used for another purpose. However, there have been attempts to incorporate circuitry which compensates for fabrication errors.

Such errors can be corrected using a median of a neighborhood surrounding the faulty pixel.

The median also has other applications which are well known in the art.

SUMMARY

The present disclosure describes performing the median function over a pixel neighborhood. The result of that median function can be used to simulate an effect which is perceived by the user. According to the present system, on-chip processing is used to hardware-calculate the median function.

A number of different embodiments are described to use hardware to calculate the median function. That hardware is preferably on the same chip as the image sensor. Most preferably, this uses active pixel sensors, in which some circuitry is integrated onto the substrate along with the photosensor.

BRIEF DESCRIPTION OF THE DRAWINGS

These and other aspects of the invention will now be described with reference to the attached drawings, in which.

DESCRIPTION OF THE PREFERRED EMBODIMENT

A median filter operates on a neighborhood of pixels. The most commonly-used sizes include 3×3 and 5×5 neighborhood sizes. The median function seeks to determine, among the neighborhood of N×N pixels, which pixel among those N×N pixels has the median amount of brightness. The median is always exactly one of those pixels, and represents the one pixel which represents the best fit. The present system proposes using a 3×3 neighborhood as the best tradeoff in an active pixel sensor.

Different ways are known in the art for forming a median value from the 3×3 square neighborhood. This involves different rows and columns, requiring obtaining physically separated values. One interesting way of forming a median is described in the article "A Two Dimensional Visual Tracking Array" (Steven P. DeWeerth and Carver A. Mead, MIT Press 1988). This article describes using hardware in a VLSI chip to track the center intensity of a visual field. One application of this circuit is in computing the median value.

The system as disclosed uses a network of resistors to form a ladder. n resistors are connected in series, with voltages $V_o$ and $V_n$ applied to the ends of the resistive line. This produces a linear voltage gradient along the array, with the voltage at the Nth node given by:

$$Vn = \left(\frac{Vn - Vo}{N}\right)n + Vo$$

A transconductance amplifier is formed of a differential stage that produces an output current as a function of the bias current, and the differential input voltage. The output current corresponds to the bias current multiplied by the difference between the input voltages.

Figure 1:
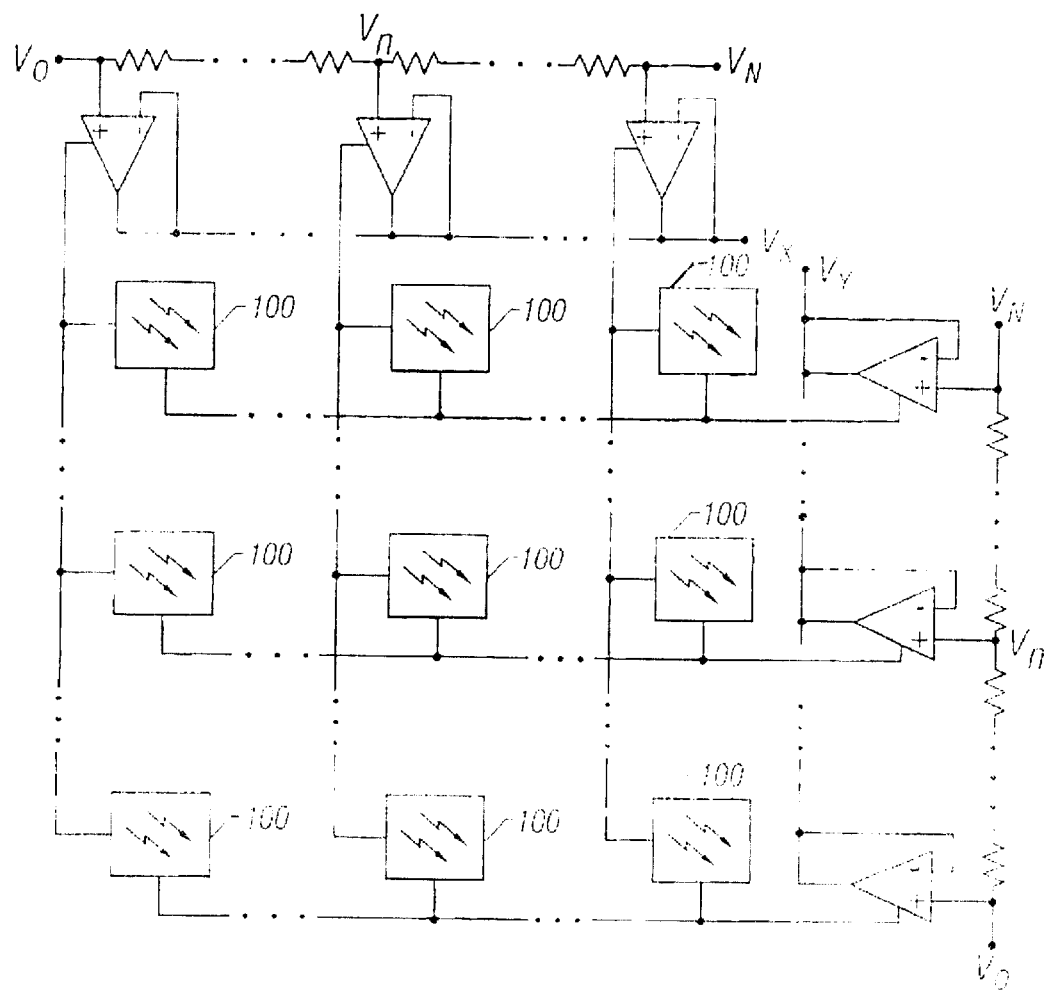
FIG. 1 shows a prior art hardware technique of finding the median value.

In the system described in this article, the transconductance amplifier is replaced with a phototransistor of a light receiving element. The phototransistor produces a current that is proportional to light intensity. This current is used as the bias current. The input voltages to the amplifiers are obtained from the resistive line. Hence, the output of each amplifier corresponds to the input of the amplifier weighted by the corresponding light intensity. That output is fed back to the input as the differential current. A higher bias input produces more output, and hence makes the output of the amplifier more closely resemble the input. The amplifier with the highest output, therefore, represents the position whose value received the highest input. A two-dimensional array can be used to find the median of a 3×3 system. The two-dimensional array (FIG. 7 of this article) is shown in FIG. 1. Each receptor 100 is alternated so that the currents from adjacent receptors are added to opposing axes.

While the above has described how such a system would operate, it should be understood that any similar median obtaining structure could be used.

The original circuit as proposed included a differential pair within each pixel. The bias voltage was provided by a photoreceptor.

However, this system had drawbacks. The fill factor of such a system is relatively low. In addition, this system actually did not provide the pixel readout value: it only provided the median value.

DESCRIPTION OF THE PREFERRED EMBODIMENT

Figure 2:
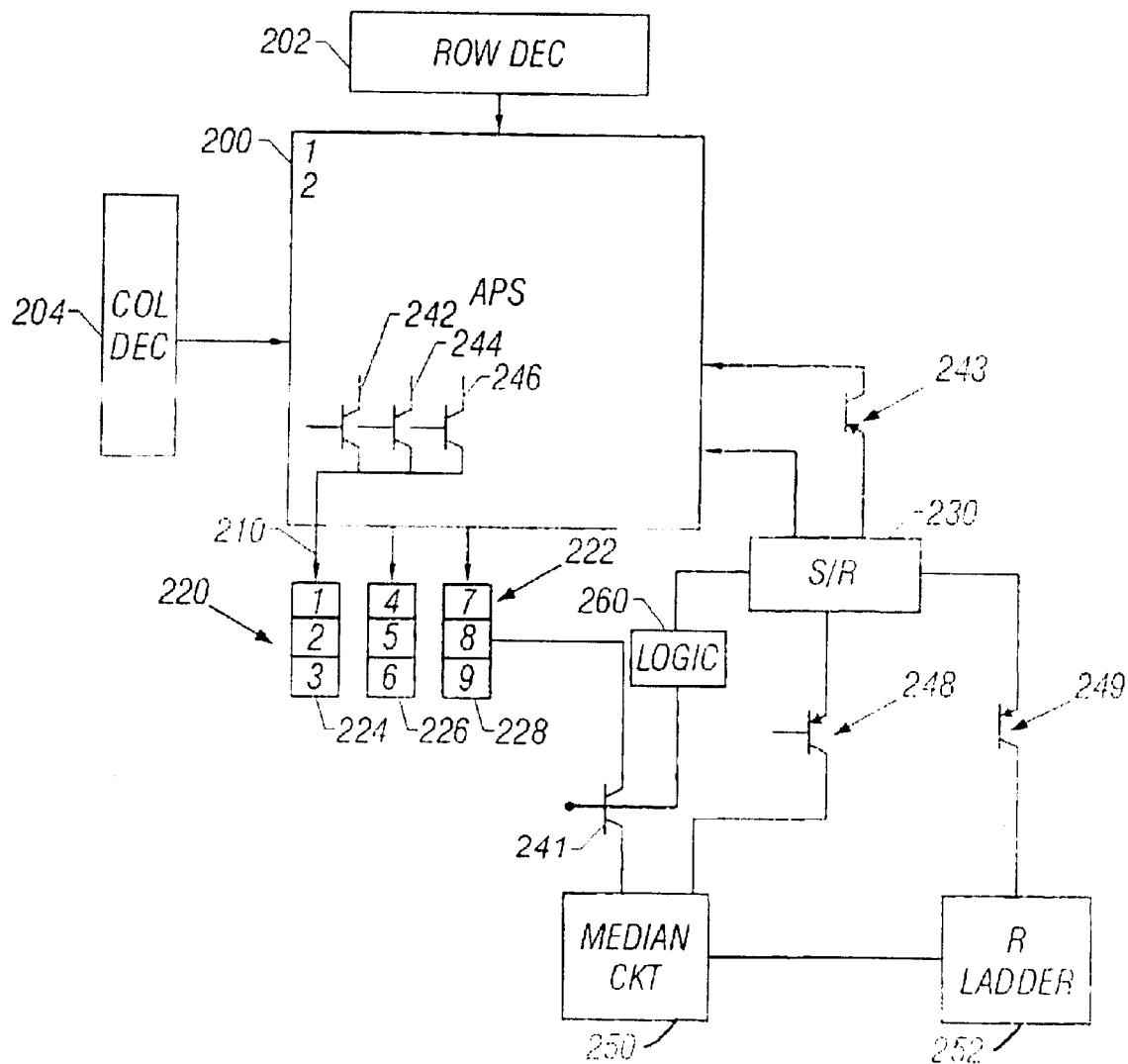
FIG. 2 shows an embodiment of a median calculating circuit for an active pixel sensor.

The present embodiment uses this or similar median calculating circuitry to form the median of a desired neighborhood of pixels within an active pixel array circuit. An embodiment is shown in FIG. 2. A typical active pixel sensor array 200 is of the general type described in U.S. Pat. No. 5,471,515, the disclosure of which is incorporated by reference herein.

The actual image sensor array 200 is connected to a row decoder 202 and a column decoder 204. These two elements provide input to the active pixel sensor array which produces outputs 210. The outputs can be produced individually, or in some parallel form such as column parallel. The system shown in FIG. 2 is preferably column parallel. This system needs a buffer 220 of three rows for each 3×3 element median calculation. Each new row is added to the active part of the buffer 220 at each time, and the oldest row of the three is dropped off at that point.

When the buffer is properly loaded with the three values therein, the median calculating circuit 250 system operates on adjacent neighborhoods of 3×3 at each time. Each 3×3 operation allows providing the median results of all the pixels in a certain portion. Therefore, in the first cycle, the group 222 is medianed, thus providing the median of the first value (col. 1, row 1), 4th (col. 2, row 1), and 7th (col. 3, row 1) values. Similarly, in the second cycle, the 2nd (col. 1, row 2), 5th and 8th values are calculated, and in the third cycle, the 3rd, 6th and 9th values are calculated. This provides the median at the time X.

At the next time period, everything is shifted over by one column by changing the control values. This reconfigures the connections to the buffer 220. These connections are stored for example in shift register 230. Buffer parts 226 and 228 keep their values (columns 2 and 3 respectively). Buffer part 224 is filled with the contents of column 4. Similarly, at time (X+2), buffer 226 contains the oldest information and is dropped and replaced with column 5's contents. The operation can be done in circuitry by using, for example, shift register 230. Alternatively, these reconfigurations can be handled by a microcontroller or ASIC.

Figure 3:
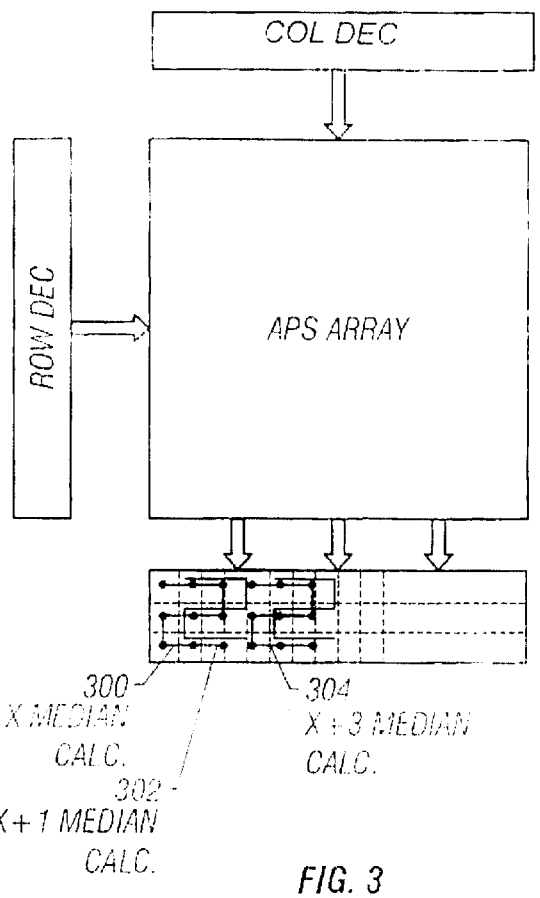
FIG. 3 shows a block diagram of the median calculation operations as carried out with a buffer in an active pixel array.

FIG. 3 shows using a 3 row buffer in a column-parallel implementation. This shows the group 300 used for the X median calculation as well as the group used for the X+1 median calculation 302 and for the X+3 median calculation 304. The subsequent median calculations are carried out by reconfiguring the neighborhood that is presently being calculated.

Other control values are also stored in shift register 230 to effect the pixel input and output connection. These control values include the values for the resistive ladder which can include horizontal and vertical resistor valves RH and RV, beginning and end voltages, Vo and Vn. These values can be changed in sequence to remake the proper connection. The connections are made by on and off transistors such as 241, 242, 243, 244, 246, 248, 249. Each column can include such transistors 242, 244, 246. Turning on a transistor connects that column to the buffer. The resistor ladder values are controlled by transistors such as 248, 249 which pass their values in the linear mode.

The shift register 230 also stores compensation values for operating at the top and bottom part of the array. This uses an end of frame signal as the last row read out. The end of frame signal causes that row to be read into the buffer two or more times in order to obtain a more appropriate median result. The operation is controlled by logic circuit 260, which can include a microcontroller or logic values.

The same problem occurs also with the beginning and the end of the row. The same solution could be executed by logic circuit 260, i.e. padding of the first and last column pixels.

An alternative is to output only the "real" median values. In this case, the effective array size can be smaller than the original, by four pixels (two at the beginning and two at the end) in each dimension. This alternative is also programmed into logic circuit 260.

Figure 4:
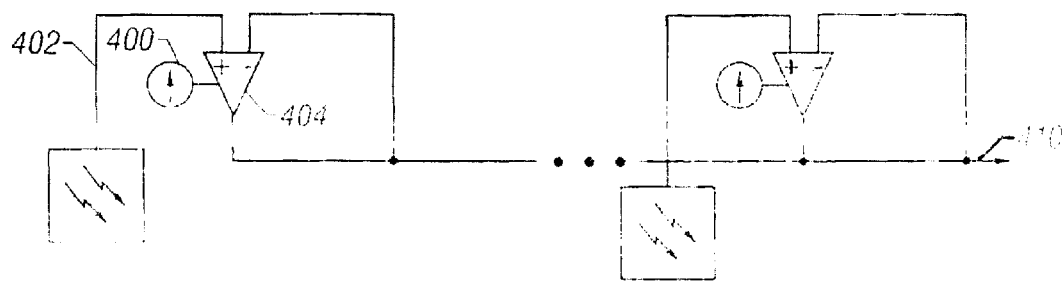
FIG. 4 shows an alternative embodiment in which the median value itself is outputted instead of the position of the median value.

An alternative embodiment shown in FIG. 4 operates without an encoder operation, i.e. without resistive ladder 252. All differential pairs are biased by the same specific current 400. The sensor's voltages such as 402 are input directly to one of the inputs of the differential amplifier 404. The other input is connected, like in the FIG. 1 circuit, to the common amplifier output. This embodiment, instead of outputting an encoded value indicative of the median, actually outputs the value of the median at 410. This latter system enables using simpler switching, since switches for position encoding, are not necessary.

Figure 5:
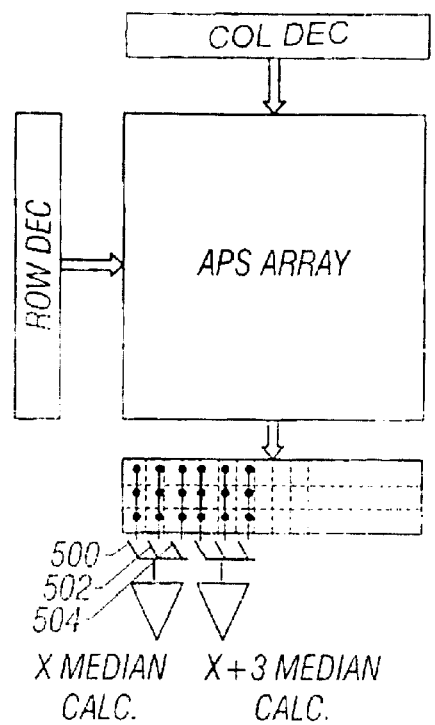
FIG. 5 shows a block diagram of the FIG. 4 alternative embodiment.

Only switches such as 500, 502, 504 for connecting the 3×3 differential pairs to a common load and amplifier are necessary as shown in FIG. 5.

Each column of 3 could be looked upon as one basic element that needs to be connected/disconnected to a certain amplifier as shown in FIG. 5. As before, processing of every 3 contiguous columns is done in parallel. FIG. 4 shows one of those units. Three cycles are required to provide the median results for the whole row.

Figure 6:
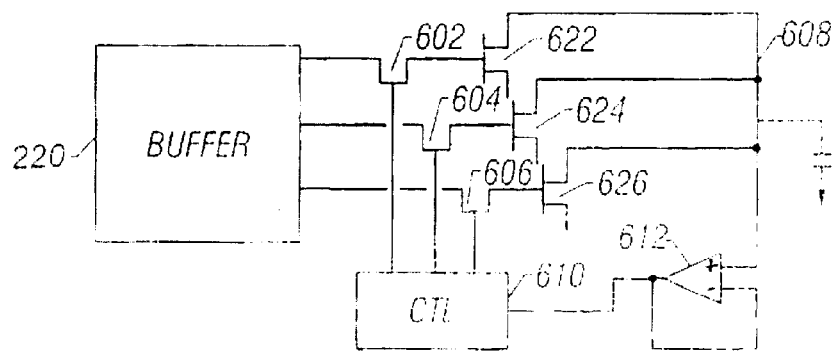
FIG. 6 shows an alternative embodiment which selectively adds and removes items to find the median.

Another embodiment is shown in FIG. 6. A neighborhood of values is read from buffer 220 through switches 602, 604, 606, to source followers 622, 624, 626 to a common line 608 shown with its stray capacitance. While only three connections are shown, it should be understood that many more connections are possible. The operation is controlled by controller 610. The line is initially charged. After the initial charging, at each clock cycle, one of the inputs is disconnected by control element 610 which controls gates at the source followers.

The output 608 is connected to transconductance amplifiers of the previously-discussed type 612. The disconnected value which changes the result the most is the highest result. This value is inhibited by control circuit 610.

Then, the same procedure is repeated on the remaining input voltages. The value whose disconnection affects the output the most is again highest of the inputs, making this the second highest value. This procedure is repeated until the median is found. If a neighborhood of 9 is used, the operation requires 9+8+7+6+5 cycles to find the median. A 3 row buffer is still required, and switches for passing the appropriate values to the source follower is also required. FIG. 6 shows the controller detecting which value causes the most change based on outputs of the transconductance amplifier.

Another embodiment uses winner-take-all ("WTA") circuitry 700 with the APS array. Different WTA circuits, such as those shown in U.S. Pat. Nos. 5,561,287 and 5,059,814 are known.

Each winner is inhibited for the truncated integer (N/2) where N is the total number of elements. Here, that is 4 times for a 3×3=9 neighborhood. The next winner would be the median. This will require 5 cycles of operation. This circuit can also be used for finding the runner-up, etc.

Figure 7:
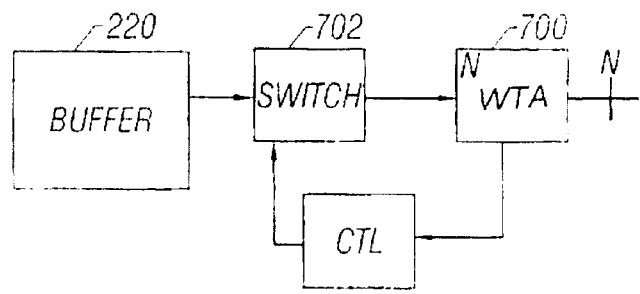
FIG. 7 shows an embodiment using winner-take-all circuitry.

If speed is the main consideration, additional circuitry can enable the median output in one cycle. Using a modified WTA circuit where K winners are selected at a time as shown in FIG. 7 enables the median operation in two cycles. For the 3×3 area, the 4 winners at first using a 4-WTA circuit and then the median at the second cycle, using a 1-WTA.

A 3 row buffer 220 is still required, and switches 702 for passing the appropriate values to the WTA.

Although only a few embodiments have been described in detail above, other embodiments are contemplated by the inventor and predictable based on the disclosure. All of these embodiments are intended to be encompassed within the following claims. In addition, other modifications are contemplated and are also intended to be covered.

What is claimed:

1. An image outputting device, comprising:
    an active pixel sensor array, comprising a plurality of pixels, each pixel having a photoreceptor and an active element integrated in with the photoreceptor and producing outputs in parallel, one increment of outputs being produced at each time of readout, each increment of outputs indicating a specified part of an image sensed by the active pixel sensor array;
    a buffer, storing at least one of said increments;
    a median calculating circuit, operating to calculate and output a median of a specified neighborhood of image values;
    a switching circuit, connected between said buffer and said median calculating circuit, said switching circuit selectively switching a new neighborhood to said median calculating circuit at each time; and
    a controller, detecting neighborhoods which represent edges of the active pixel sensor array, and changing the neighborhood to compensate for said edges.

2. A device as in claim 1 wherein said increment is a column.

3. A device as in claim 2 wherein said median calculating circuit detects a median of an N×N neighborhood where N is greater than 1.

4. A device as in claim 3 wherein said buffer stores N columns of information.

5. A device as in claim 1 wherein said changing comprises doubling at least one of said rows to compensate for an otherwise missing row.

6. A device as in claim 1 wherein said changing comprises changing a size of a total neighborhood for areas near said edges.

7. A method of operating an image sensor, comprising:
    providing an active pixel sensor which has a photosensitive element, and an active element integrated inside the pixel with the photosensitive element;
    operating the active pixel sensor to output a plurality of information for a plurality of pixels at one time;
    determining a median of the output information for the plurality of pixels, such that both the original output information and the median are both simultaneously available; and
    compensating for edges of the active pixel array when calculating the median.

8. A method as in claim 7 further comprising storing a plurality of clock cycles of information to provide a neighborhood from which the median is calculated.

9. A method as in claim 8 further comprising switching a plurality of values from the stored clock cycles of information, whose value is to be median-calculated.

10. A method as in claim 9 further comprising, at each clock cycle, switching some of said values which are oldest and retaining others of said values which are less old.

11. A method as in claim 9 wherein said median is calculated using a winner-take-all circuit.

12. A method as in claim 11 wherein said winner-take-all circuit is used to determine a highest value pixel, which is removed, followed by removing others of the highest value pixels until a median pixel is obtained.

13. A method as in claim 11 wherein said winner-take-all circuit produces the X highest winners, and identifies the median from among those X highest winners.

14. A method as in claim 7 wherein said calculating a median comprises calculating a median of a unit of the signal, calculating a median of other units of the signal, and determining a median of the whole neighborhood from the individual medians of the units.

15. An image sensor which produces a median value, comprising:
    a pixel sensor, including an array of pixels arranged in rows and columns, each pixel including a photosensitive element which produces an electrical output indicative of an amount of light impinging thereon;
    a buffer, which stores a plurality of values from said pixel sensor;
    a switching network, connected to different elements of said buffer, in a way that allows switching any desired unit of said values in said buffer to an output thereof;
    a memory which stores information that is used to set values; and
    a median circuit, coupled to said output of said buffer, said median circuit producing an output indicative of a median of a neighborhood of values switched thereto by said switching network, wherein said median circuit uses a resistive ladder to encode positions of different values in said median circuit to be used to identify which of the pixels represents the median, said resistive ladder having values controlled by said information in said memory.

16. A device as in claim 15 wherein said unit is a portion of a column.

17. A device as in claim 15 wherein said pixel sensor is an active pixel sensor which includes an active device integrated into each pixel along with said photosensor.

18. An apparatus as in claim 17 wherein said median circuit comprises a winner-take-all circuit.

19. An apparatus as in claim 17 wherein said median circuit comprises a switching array first obtaining an average of said signals and second determining the difference between said average of said signals and each signal individually, a signal which has the smallest difference being a determined median.

20. A device as in claim 15 wherein said values include a beginning and ending value of the resistive ladder.

21. An apparatus as in claim 20 further comprising additional switches which operate in an active mode to switch analog values from said memory to said median circuit/resistive ladder.

* * * * *